United States Patent
Sumiya

(10) Patent No.: US 10,246,042 B2
(45) Date of Patent: Apr. 2, 2019

(54) AIR BAG DEVICE

(71) Applicant: Autoliv Development AB, Vårgårda (SE)

(72) Inventor: Tomohiro Sumiya, Yokohama (JP)

(73) Assignee: AUTOLIV DEVELOPMENT AB, Vårgårda (SE)

( * ) Notice: Subject to any disclaimer, the term of this patent is extended or adjusted under 35 U.S.C. 154(b) by 136 days.

(21) Appl. No.: 15/319,904

(22) PCT Filed: May 1, 2015

(86) PCT No.: PCT/JP2015/063150
§ 371 (c)(1),
(2) Date: Dec. 19, 2016

(87) PCT Pub. No.: WO2015/198717
PCT Pub. Date: Dec. 30, 2015

(65) Prior Publication Data
US 2017/0120856 A1    May 4, 2017

(30) Foreign Application Priority Data

Jun. 25, 2014 (JP) .................................. 2014-130828

(51) Int. Cl.
*B60R 21/233* (2006.01)
*B60R 21/2338* (2011.01)
(Continued)

(52) U.S. Cl.
CPC .......... *B60R 21/233* (2013.01); *B60R 21/013* (2013.01); *B60R 21/203* (2013.01);
(Continued)

(58) Field of Classification Search
CPC . B60R 21/233; B60R 21/2338; B60R 21/239; B60R 21/231; B60R 21/23138;
(Continued)

(56) References Cited

U.S. PATENT DOCUMENTS

| 4,262,931 A | 4/1981 | Strasser et al. |
| 7,152,880 B1 | 12/2006 | Pang et al. |

(Continued)

FOREIGN PATENT DOCUMENTS

| CA | 1 160 657 | 1/1984 |
| CA | 2 584 099 | 10/2007 |

(Continued)

OTHER PUBLICATIONS

PCT International Search Report—dated Oct. 6, 2015.
(Continued)

*Primary Examiner* — Keith J Frisby
(74) *Attorney, Agent, or Firm* — Brinks Gilson & Lione

(57) ABSTRACT

An airbag device capable of restraining an obliquely forward movement of an occupant. The airbag device includes: an inflator which is operated by a signal from a sensor that detects a collision and which discharges expansion gas; to deploy and expand the airbags. The airbags include: a first airbag which deploys to the front of an occupant for restraining a forward movement of the occupant; and a second airbag which is joined to a side part of the first airbag on a cabin center side and restrains an obliquely forward movement of the occupant. The collision sensor is capable of discriminating between a first collision mode which is not accompanied by rotation of the vehicle and a second collision mode which is accompanied by a rotation of the vehicle in a horizontal plane, and the second airbag is deployed only when the second collision mode occurs.

16 Claims, 10 Drawing Sheets

SECOND COLLISION MODE
(VEHICLE ROTATES)

(51) Int. Cl.

| | | |
|---|---|---|
| *B60R 21/239* | (2006.01) | |
| *B60R 21/013* | (2006.01) | |
| *B60R 21/205* | (2011.01) | |
| *B60R 21/203* | (2006.01) | |
| *B60R 21/231* | (2011.01) | |
| *B60R 21/263* | (2011.01) | |
| *B60R 21/00* | (2006.01) | |

(52) U.S. Cl.
CPC .......... *B60R 21/205* (2013.01); *B60R 21/231* (2013.01); *B60R 21/239* (2013.01); *B60R 21/2338* (2013.01); *B60R 21/23138* (2013.01); *B60R 21/263* (2013.01); *B60R 2021/0004* (2013.01); *B60R 2021/0009* (2013.01); *B60R 2021/0023* (2013.01); *B60R 2021/0048* (2013.01); *B60R 2021/2395* (2013.01); *B60R 2021/23107* (2013.01); *B60R 2021/23308* (2013.01); *B60R 2021/23324* (2013.01); *B60R 2021/23382* (2013.01); *B60R 2021/23384* (2013.01); *B60R 2021/23386* (2013.01)

(58) Field of Classification Search
CPC ... B60R 21/203; B60R 21/013; B60R 21/205; B60R 21/2334; B60R 2021/23107; B60R 2021/0004; B60R 2021/0009; B60R 2021/0048; B60R 2021/23308; B60R 2021/23324; B60R 2021/23386; B60R 2021/23388; B60R 2021/01238; B60R 2021/0023; B60R 2021/2765; B60R 2021/2395; B60R 2021/23384; B60R 2021/23382
USPC ....... 280/730.1, 729, 735, 732, 743.1, 743.2
See application file for complete search history.

(56) References Cited

U.S. PATENT DOCUMENTS

| | | | |
|---|---|---|---|
| 7,938,444 | B2 | 5/2011 | Williams et al. |
| 8,882,138 | B1 | 11/2014 | Hicken et al. |
| 2002/0135164 | A1 | 9/2002 | Thomas |
| 2003/0115945 | A1 | 6/2003 | Abe |
| 2003/0218325 | A1 | 11/2003 | Hasebe et al. |
| 2004/0051285 | A1 | 3/2004 | Fischer |
| 2005/0029779 | A1 | 2/2005 | Bito et al. |
| 2005/0230945 | A1 | 10/2005 | Watanabe |
| 2006/0186656 | A1 | 8/2006 | Kumagai |
| 2010/0090445 | A1 | 4/2010 | Williams et al. |
| 2013/0001934 | A1 | 1/2013 | Nagasawa et al. |
| 2014/0361521 | A1 | 12/2014 | Fukawatase |
| 2015/0054267 | A1* | 2/2015 | Komamura .......... B60R 21/276 280/735 |
| 2015/0175116 | A1* | 6/2015 | Cho ..................... B60R 21/205 280/729 |

FOREIGN PATENT DOCUMENTS

| | | |
|---|---|---|
| CN | 1459394 A | 12/2003 |
| CN | 1824548 A | 8/2006 |
| CN | 1951732 A | 4/2007 |
| CN | 200985009 Y | 12/2007 |
| CN | 200985010 Y | 12/2007 |
| CN | 102849017 A | 6/2011 |
| CN | 102186702 A | 9/2011 |
| DE | 602 04 277 T2 | 11/2005 |
| DE | 10 2007 032 761 A1 | 1/2008 |
| DE | 10 2007 032 763 A1 | 1/2008 |
| DE | 10 2012 018 450 A1 | 3/2014 |
| EP | 1 364 838 A2 | 5/2003 |
| EP | 1 398 228 A2 | 3/2004 |
| EP | 1 498 320 A2 | 1/2005 |
| EP | 1 775 176 A1 | 4/2007 |
| EP | 1 775 177 A1 | 4/2007 |
| EP | 1 842 742 A2 | 10/2007 |
| EP | 1 693 256 B1 | 8/2008 |
| EP | 2 799 292 A1 | 11/2014 |
| JP | 56-67649 | 6/1981 |
| JP | 3-329656 | 2/1991 |
| JP | 4-55141 | 2/1992 |
| JP | 5-65706 | 8/1993 |
| JP | 1993-065706 U | 8/1993 |
| JP | 6-72276 | 3/1994 |
| JP | 6-80057 | 3/1994 |
| JP | 8-72261 | 3/1996 |
| JP | 8-268204 | 10/1996 |
| JP | 8-8268204 A | 10/1996 |
| JP | 10-71920 | 3/1998 |
| JP | 2000-280845 | 10/2000 |
| JP | 2003-182500 | 7/2003 |
| JP | 2003-335203 | 11/2003 |
| JP | 2004-262432 | 9/2004 |
| JP | 2005-88681 | 4/2005 |
| JP | 2005-247118 | 9/2005 |
| JP | 2006-88856 | 4/2006 |
| JP | 2006-256508 | 9/2006 |
| JP | 2006-327505 | 12/2006 |
| JP | 2007-112427 | 5/2007 |
| JP | 2007-112430 | 5/2007 |
| JP | 2007-216733 | 8/2007 |
| JP | 2007-276771 | 10/2007 |
| JP | 2008-44594 | 2/2008 |
| JP | 2008-44594 A | 2/2008 |
| JP | 2008-114615 | 5/2008 |
| JP | 2008-179173 | 8/2008 |
| JP | 2009-227180 | 3/2009 |
| JP | 2009-120114 | 6/2009 |
| JP | 2010-201980 | 9/2010 |
| JP | 2012-56371 | 3/2012 |
| JP | 2012-505783 | 3/2012 |
| JP | 2012-505783 A | 3/2012 |
| JP | 2013-14176 | 1/2013 |
| JP | 2013-35473 | 2/2013 |
| JP | 2013-112276 | 6/2013 |
| JP | WO 2013/099036 A1 | 7/2013 |
| JP | 2014-121965 | 7/2014 |
| KR | 2007-0042093 | 4/2007 |
| KR | 2007-0052192 | 5/2007 |
| KR | 10-2011-0071076 A | 6/2011 |
| KR | 2011-0071076 | 6/2011 |
| MX | 2007003946 A | 11/2008 |
| WO | WO 2010/045040 A1 | 4/2010 |

OTHER PUBLICATIONS

PCT International Search Report—dated Jun. 23, 2015.
International Search Report of PCT/JP2015/063150 dated Jun. 23, 2015.
Written Opinion of the International Searching Authority of PCT/JP2015/063150 dated Jun. 23, 2015.
International Preliminary Report on Patentability of PCT/JP2015/063150 dated Dec. 27, 2016.

* cited by examiner

PRIOR ART

FIRST COLLISION MODE
(VEHICLE DOES NOT ROTATE)

SECOND COLLISION MODE
(VEHICLE ROTATES)

FIRST COLLISION MODE
(VEHICLE DOES NOT ROTATE)

SECOND COLLISION MODE
(VEHICLE ROTATES)

FIRST COLLISION MODE
(VEHICLE DOES NOT ROTATE)

FIRST COLLISION MODE
(VEHICLE DOES NOT ROTATE)

FIRST COLLISION MODE
(VEHICLE DOES NOT ROTATE)

SECOND COLLISION MODE
(VEHICLE ROTATES)

AIR BAG DEVICE

CROSS REFERENCE TO RELATED APPLICATIONS

This application claims priority to Japanese Patent Application No. 2014-130828, filed on Jun. 25, 2014 and PCT/JP2015/063150, filed on May 1, 2015.

FIELD OF THE INVENTION

The present invention relates to an airbag device which protects an occupant inside a vehicle by deploying an airbag. In particular, the present invention relates to an airbag device which is arranged inside an instrument panel of a vehicle and which mainly protects an occupant in a passenger seat.

BACKGROUND

Generally, a passenger seat airbag device for a passenger motor vehicle adopts a structure in which an inflator that generates expansion gas and an airbag that expands and deploys due to the gas are housed inside an instrument panel. During a collision of a vehicle, the inflator operates to expand the airbag, and the airbag deploys toward the inside of the vehicle to restrain a forward movement of an occupant.

In recent years, safety is increasingly being required in various collision modes including, in addition to a head-on collision in which a vehicle collides head-on with an obstacle (an oncoming vehicle or the like), a case where an obstacle collides with a part of a vehicle (an offset collision) and a case where a part of a vehicle collides with an obstacle from an oblique direction (skewed from the longitudinal direction).

FIG. 1 is a plan view which shows a structure of a conventional vehicle (a left-hand drive vehicle) including airbag devices for a driver's seat and a passenger seat and which shows a situation where the vehicle is approaching, at an angle of 0 degrees, an object (an obstacle) at a position deviated from directly in front of the vehicle. A driver's seat airbag 16 is housed inside a steering wheel 14 in front of a driver 10 and is configured to deploy toward the driver when a collision occurs. A passenger seat airbag 18 is housed inside an instrument panel in front of an occupant 12 of the passenger seat and is configured to deploy toward the occupant when a collision occurs. The airbags 14 and 18 are configured to expand due to expansion gas supplied from an inflator (not shown) which is operated by a signal of a collision sensor.

FIG. 2 is a plan view which shows a structure of a conventional vehicle mounted with airbag devices for a driver's seat and a passenger seat and which shows a situation where the vehicle is approaching, at a prescribed angle θ, an object (an obstacle) at a position deviated from directly in front. FIG. 3 shows a situation where a vehicle body rotates after colliding with the object (an obstacle) from the state shown in FIG. 2. In a situation such as that shown in FIG. 3, there is a risk that the occupant 12 of the passenger seat may slide across the side of passenger seat airbag 18 and collide with a center console between the driver's seat and the passenger seat. In this case, in addition to an injury caused by a direct collision with the center console, the occupant 12 may suffer head injury due to a rotation of the head. A brain damage index thereof is referred to as BRIC (Brain Rotational Injury Criteria).

SUMMARY AND INTRODUCTORY DESCRIPTION

The present invention has been made in consideration of circumstances such as that described above and an object thereof is to provide an airbag device capable of effectively restraining an obliquely forward movement of an occupant with a simple structure.

Another object of the present invention is to provide, in addition to the object described above, a low-cost airbag device without requiring an increase in output (capacity) of an inflator which generates expansion gas.

In order to solve the problem described above, an airbag device according to the present invention includes: an inflator which is operated by a signal from a sensor that detects a collision of a vehicle and which discharges expansion gas; and airbags which expand and deploy due to the expansion gas. The airbags include: a first airbag which deploys to the front of an occupant seated on a seat and which restrains a forward movement of the occupant; and a second airbag which is joined to a side part of the first airbag on a cabin center side and which restrains an obliquely forward movement of the occupant when deployed. The collision sensor is capable of discriminating between a first collision mode which is not accompanied by a rotation of the vehicle and a second collision mode which is accompanied by a rotation of the vehicle in a horizontal plane, and the second airbag is deployed only when the second collision mode occurs.

According to the present invention configured as described above, an obliquely forward movement of an occupant can be effectively restrained and an injury due to a collision with a center console and particularly due to a rotation of the neck (the head) of the occupant can be reduced. In addition, since the second airbag is configured to deploy only when the second collision mode occurs, by omitting an exhaust vent opening that is normally provided on the first airbag or by closing the exhaust vent opening when the second collision mode occurs, an increase in capacity of the inflator can be minimized. In other words, in the present invention, expansion gas is used in an efficient manner by selectively operating (deploying) a plurality of airbags.

A third airbag which is joined to a side part of the first airbag on a window side is further provided, wherein by giving the third airbag a structure which only deploys when the first collision mode occurs, Two of the three airbags need only be deployed in any collision mode and an increase in the capacity of the inflator can be suppressed.

In the present invention, a "rotation of a vehicle" signifies a significant rotation within a plane which is horizontal (parallel) with respect to the ground on which the vehicle travels or, in other words, a rotation component around a rotational axis which is perpendicular to the ground (such rotation also referred as yaw motion). In addition, a "rotation of a vehicle" also includes a case where a movement or a rotation other than the rotation within the horizontal plane occurs simultaneously. For example, a "rotation of a vehicle" also includes a case of a rotation with a direction of travel as an axis thereof such as a rollover while rotating horizontally (such rotation also referred to as roll motion.

DETAILED DESCRIPTION

Figure 1:
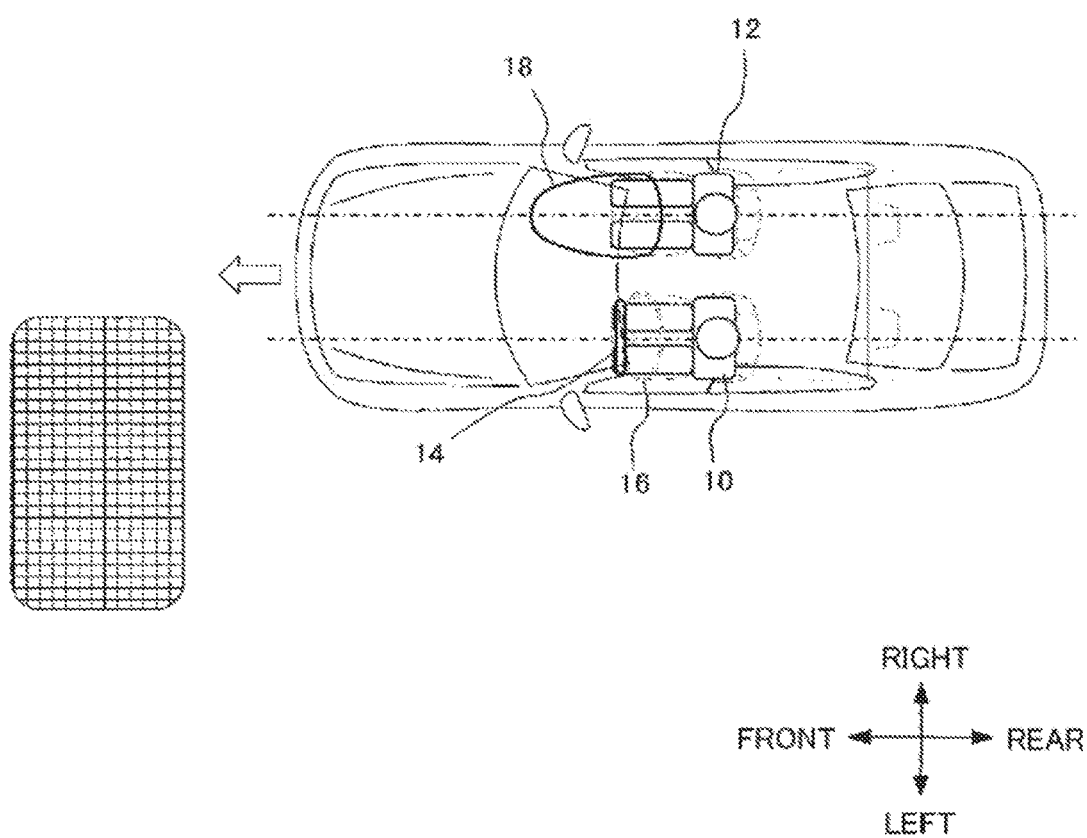
FIG. 1 is a plan view which shows a structure of a conventional vehicle mounted with airbag devices for a driver's seat and a passenger seat and which shows a situation where the vehicle is approaching, at an angle of 0 degrees, an object (an obstacle) at a position deviated from directly in front.
Figure 2:
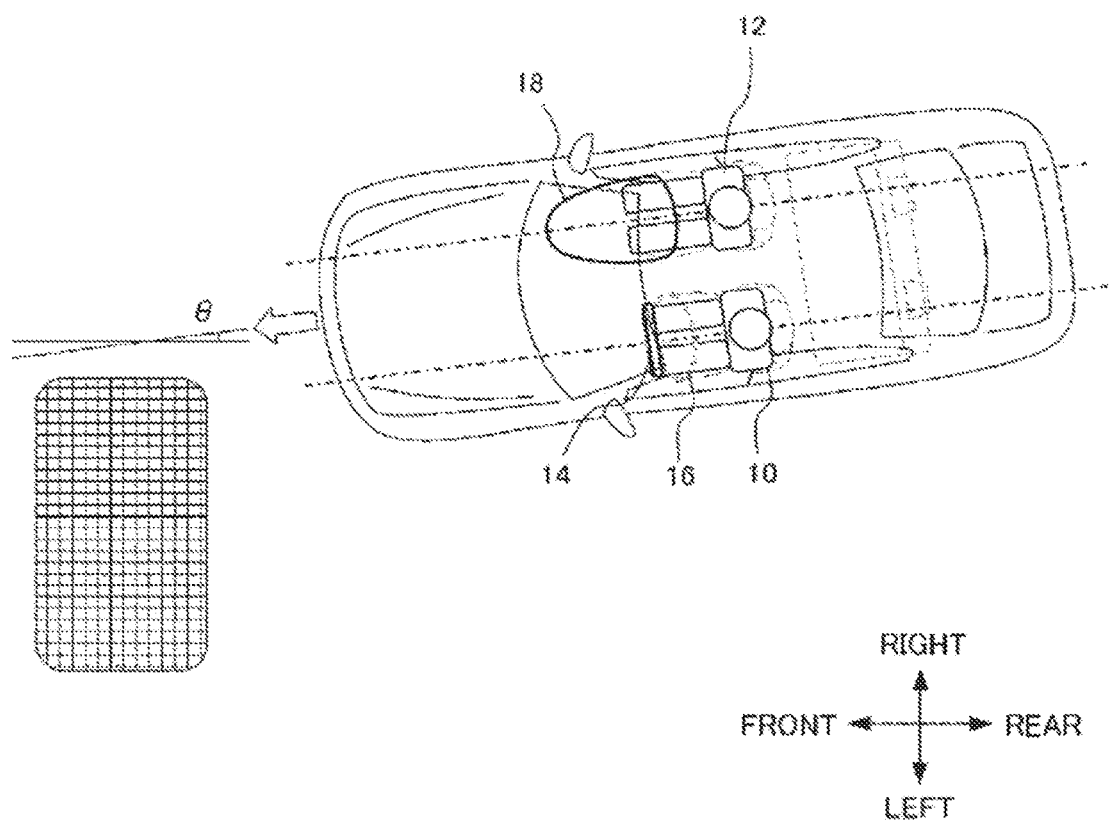
FIG. 2 is a plan view which shows a structure of a conventional vehicle mounted with airbag devices for a driver's seat and a passenger seat and which shows a situation where the vehicle is approaching, at a prescribed angle θ, an object (an obstacle) at a position deviated from directly in front.
Figure 3:
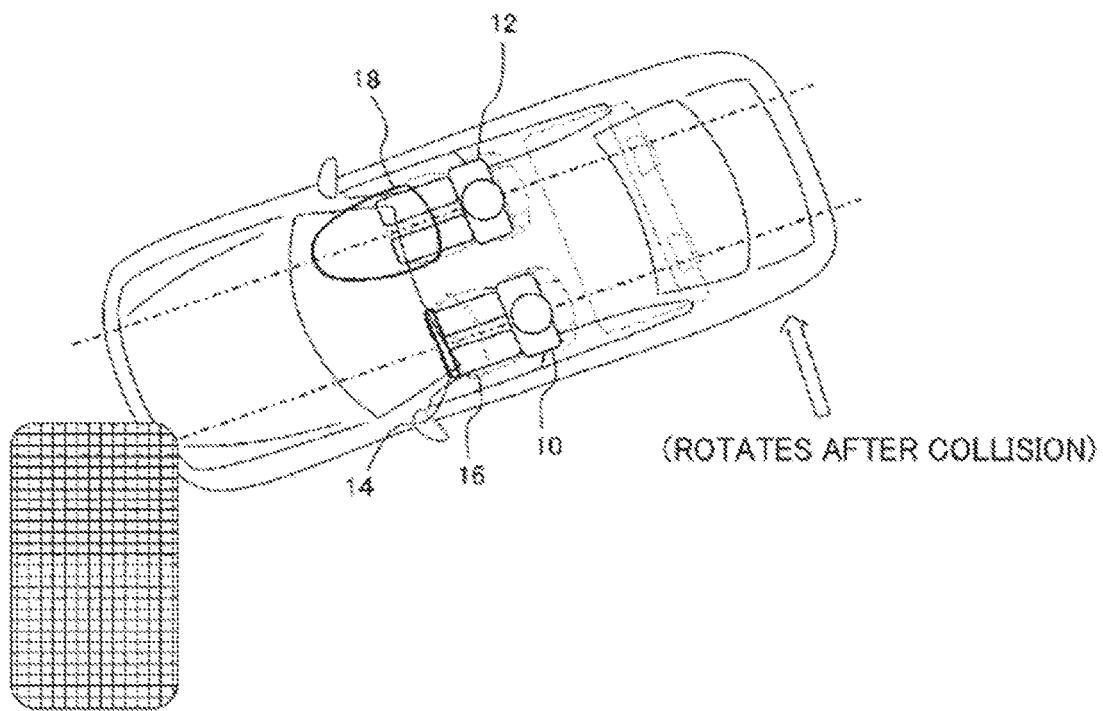
FIG. 3 is a plan view which shows a structure of a conventional vehicle mounted with airbag devices for a driver's seat and a passenger seat and which shows a situation where the vehicle approaches, at a prescribed angle θ, an object (an obstacle) at a position deviated from directly in front and a vehicle body subsequently rotates.
Figure 3:
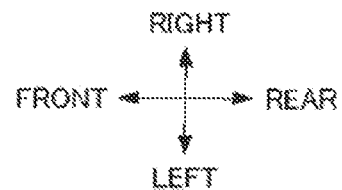
Figure 4:
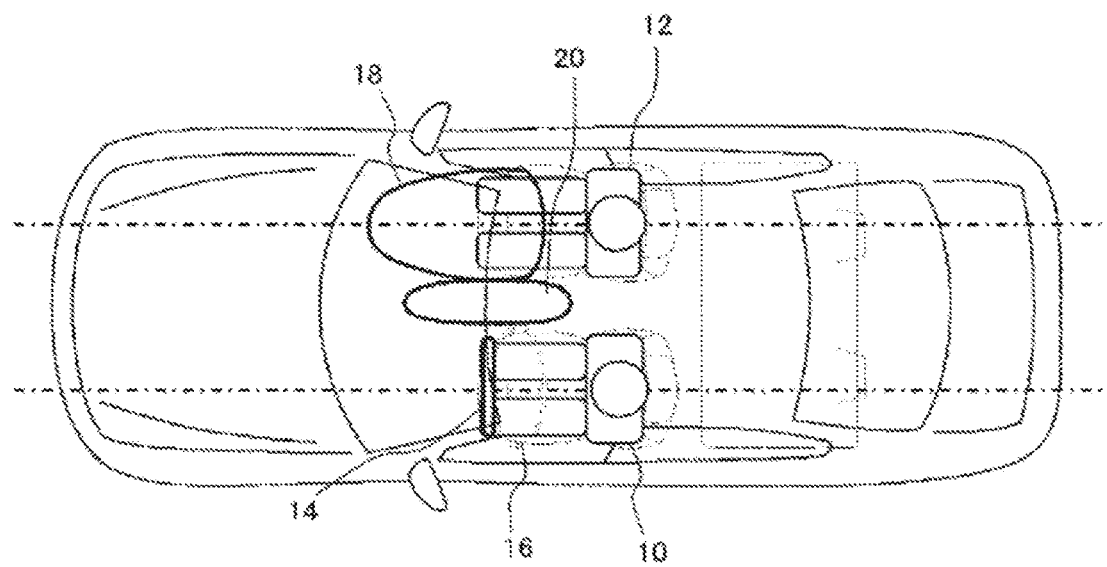
FIG. 4 is a plan view showing a schematic configuration of a vehicle mounted with an airbag device according to the present invention.
Figure 4:
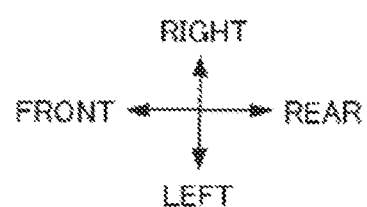

Hereinafter, the present invention will be described in detail using a passenger seat airbag device as an example. FIG. 4 is a plan view showing a schematic configuration of a vehicle mounted with the airbag device according to the present invention. The present invention adopts a structure which joins an auxiliary airbag 20 to a side part of a passenger seat airbag 18.

Figure 5:
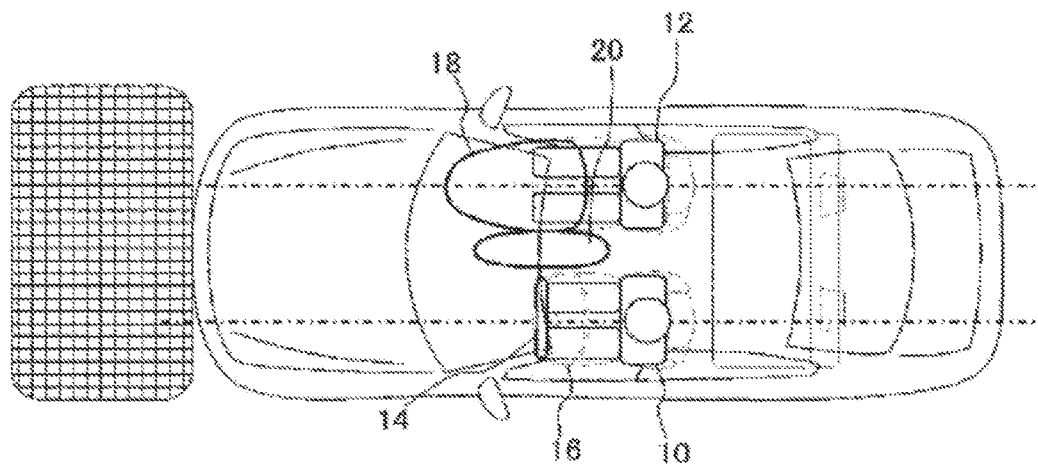
FIG. 5 is a plan view which shows a structure of a vehicle mounted with an airbag device according to the present invention and which shows a situation where the vehicle collides with an object (an obstacle) heads on (a first collision mode).
Figure 5:
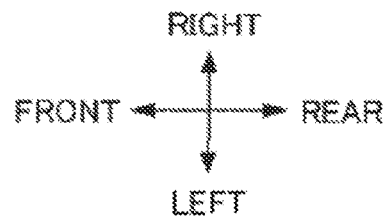
Figure 6:
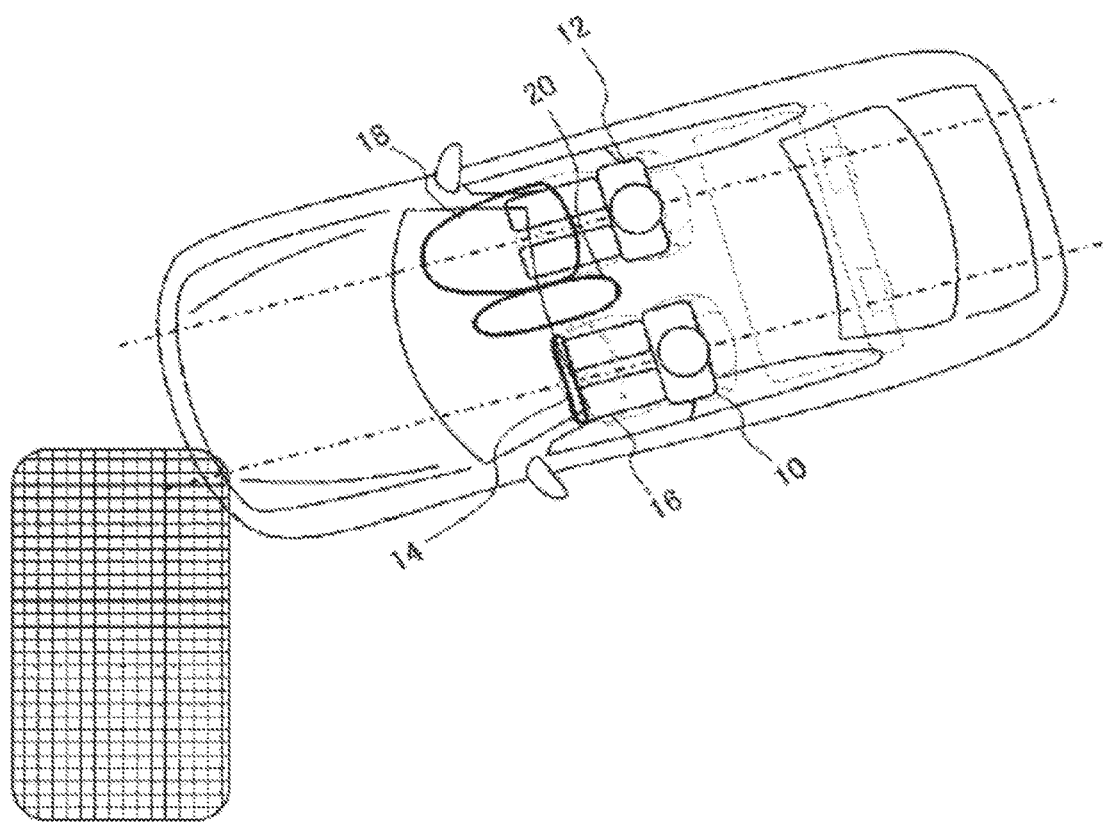
FIG. 6 is a plan view which shows a structure of a vehicle mounted with an airbag device according to the present invention and which shows a situation where the vehicle approaches, at a prescribed angle θ from a passenger seat side, an object (an obstacle) at a position deviated from directly in front and a vehicle body subsequently rotates (a second collision mode).

The airbag device according to the present invention is configured so as to operate on the assumption of at least two collision modes. FIG. 5 shows a situation where a vehicle having the airbag device according to the present invention collides with an object (an obstacle) heads on (a first collision mode). FIG. 6 shows a situation where a vehicle having an airbag device according to the present invention approaches, at a prescribed angle θ from a passenger seat side, an object (an obstacle) at a position deviated from directly in front and a vehicle body subsequently rotates (a second collision mode also referred to as an oblique collision). Moreover, the first collision mode is a mode in which a vehicle does not rotate within a horizontal plane due to the collision and the second collision mode is a mode in which a vehicle rotates within a horizontal plane due to the collision. In a collision such as that shown in FIG. 6, a passenger side occupant 12 of a passenger seat is moved toward a side of a center console between the passenger seat and the driver's seat due to inertia.

Figure 7A:
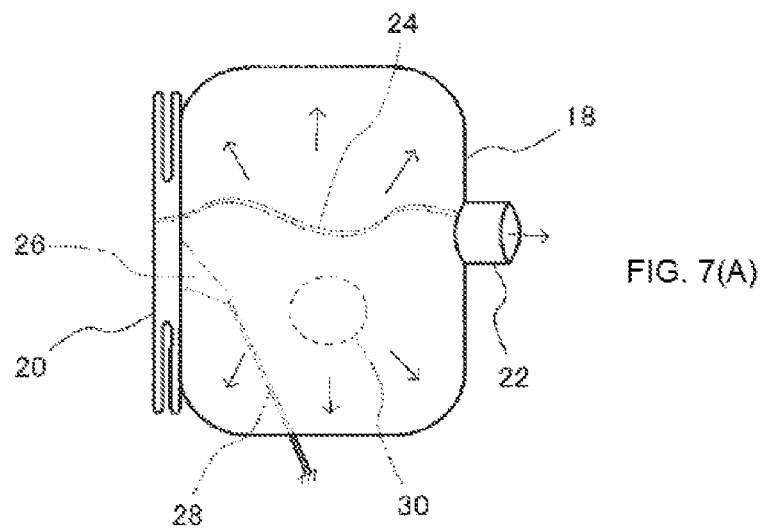
FIGS. 7(A) and 7(B) are explanatory diagrams showing an operating state of an airbag device according to a first practical example of the present invention, in which 7(A) shows a deployed state of an airbag in the first collision mode such as a head-on collision, and 7(B) shows a deployed state of the airbag in the second collision mode such as an oblique collision.
Figure 7B:
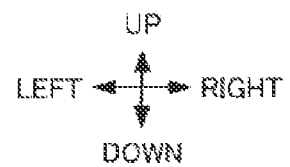
Figure 7B:
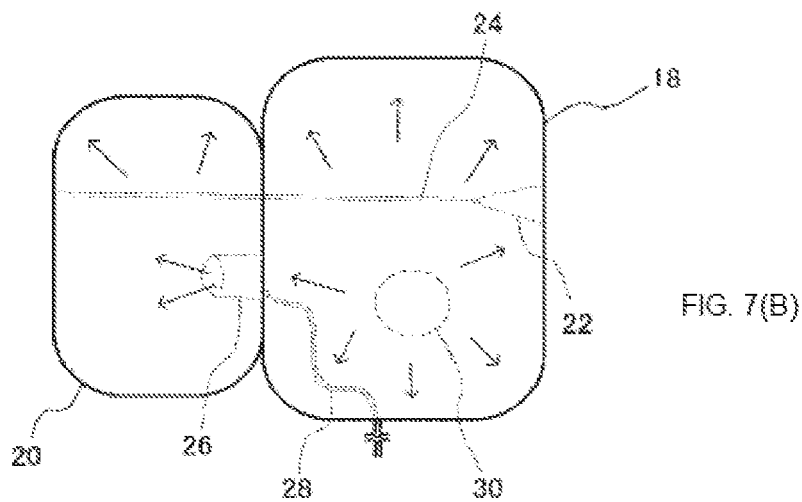

FIGS. 7(A) and (B) are explanatory diagrams showing an operating state of an airbag device according to a first example of the present invention, in which FIG. 7(A) shows a deployed state of an airbag in the first collision mode such as a head-on collision, and FIG. 7(B) shows a deployed state body of the airbag in the second collision mode such as an oblique collision. The airbag device according to the present practical example includes: a sensor 32 which detects a collision of a vehicle; an inflator 30 which is operated by a signal from the sensor 32 and which discharges expansion gas; and airbags 18 and 20 which expand and deploy due to the expansion gas. The airbags include: a first airbag 18 which deploys to the front of the occupant 12 seated on the passenger seat and which restrains a forward movement of the occupant 12; and a second airbag 20 which is joined to a side part of the first airbag 18 on the cabin center side and which restrains an obliquely forward movement of the occupant 12 when deployed. The collision sensor 32 is of a type capable of discriminating between a first collision mode which is not accompanied by a rotation of the vehicle and a second collision mode which is accompanied by a rotation of the vehicle in a horizontal plane, and the second airbag 20 is deployed only when the second collision mode occurs.

A joint of the first airbag 18 and the second airbag 20 is provided with an openable and closable first vent 26 which communicates with both airbags 18 and 20, and is configured so that inflation gas flows into the second airbag 20 from the first airbag 18 during the second collision mode. In other words, the first vent 26 is configured so as to open only when the second collision mode occurs. One end of a first tether 28 which controls opening and closing is joined to the first vent 26. Another end of the first tether 28 is joined to a housing (not shown) for the airbag and is configured so as to be severed or released or disconnected when the second collision mode is detected. An openable and closable second vent 22 is provided in a side part of the first airbag 18 on the vehicle window side (i.e. outboard side). One end of a second tether 24 for controlling opening and closing of the second vent 22 is joined to the second vent 22. Another end of the second tether 24 is joined to a vehicle center-side side surface of the second airbag.

Figure 8:
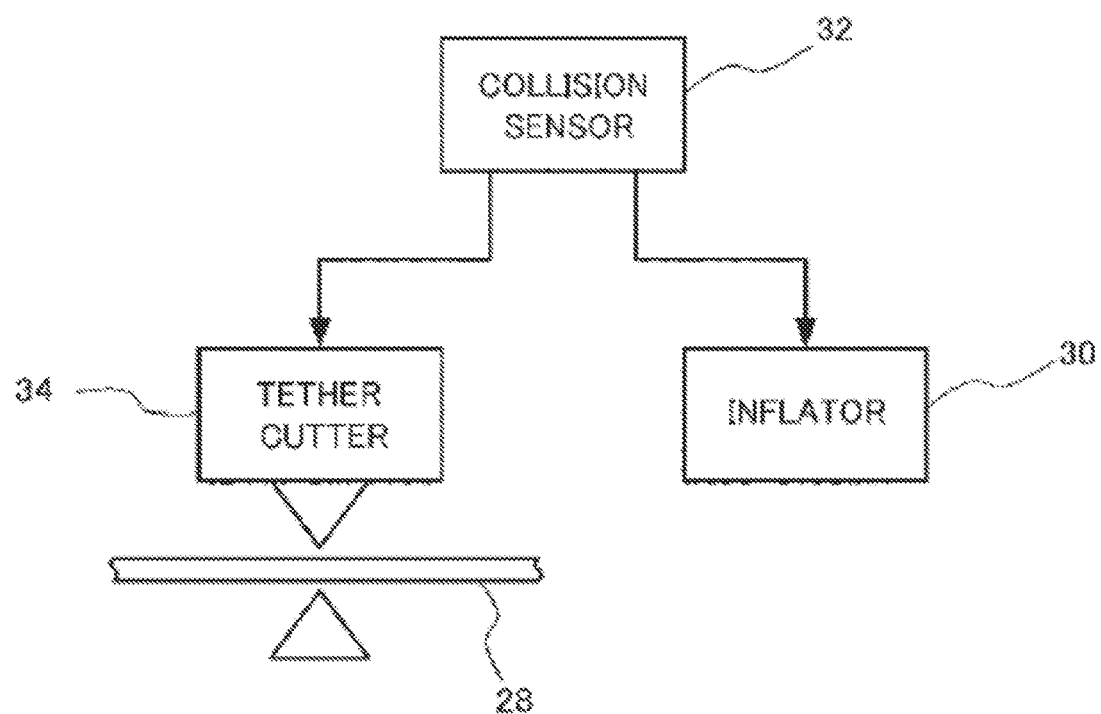
FIG. 8 is a schematic block diagram showing a configuration of a control system of an airbag device according to the present invention.

FIG. 8 is a schematic block diagram showing a configuration of a control system of an airbag device according to the present invention. In addition to detecting an occurrence of a collision of a vehicle itself, the collision sensor 32 discriminates between the first collision mode and the second collision mode. When the occurrence of a collision of the vehicle is detected by the collision sensor 32, a signal is sent to the inflator 30, and the inflator 30 operates to discharge expansion gas. When the collision sensor 32 discriminates the first collision mode, a tether cutter 34 (or alternately a release) is not driven and the first tether 28 is not severed. On the other hand, when the collision sensor 32 discriminates the second collision mode, the tether cutter 34 is driven and the first tether 28 is severed or released. As the tether cutter 34, a known structure such as that disclosed in Japanese Patent Application Laid-open No. 2010-83175 can be adopted.

Control of opening and closing of the first vent 26 and the second vent 22 is performed by adjusting tension on the tethers 28 and 24. Both vents 26 and 22 are configured such that, like a drawstring bag, an end of the tether is inserted to a peripheral edge of an opening portion, and the opening is closed by pulling the tether and opened by loosening the tether.

In the first practical example configured as described above, when the first collision mode occurs, the inflator 30 operates and the first airbag 18 expands first as shown in FIG. 7(A). At this point, since the tether cutter 34 does not sever the first tether 28, tension on the first tether 28 maintains a high state, the first vent 26 remains closed, and expansion gas does not flow into the second airbag 20. Therefore, tension on the second tether 24 remains in a low state, the second vent 22 is opened, and a part of gas is discharged from the second vent 22. A forward movement of the occupant 12 of the passenger seat is restrained by the expanded and deployed first airbag 18.

On the other hand, when the second collision mode occurs, the inflator 30 operates and the first airbag 18 expands first as shown in FIG. 7(B). At this point, the first tether 28 is severed by the tether cutter 34, the first tether 28 is loosened, the first vent 26 is opened, and expansion gas flows into the second airbag 20 via the vent 26 from the first airbag 18. Expansion of the second airbag 20 causes the second tether 24 to be pulled and the second vent 22 formed on the first airbag 18 to be closed. As a result, a forward movement of the occupant 12 of the passenger seat is restrained by the expanded and deployed first airbag 18 and, at the same time, an obliquely forward movement is restrained by the second airbag 20.

Figure 9A:
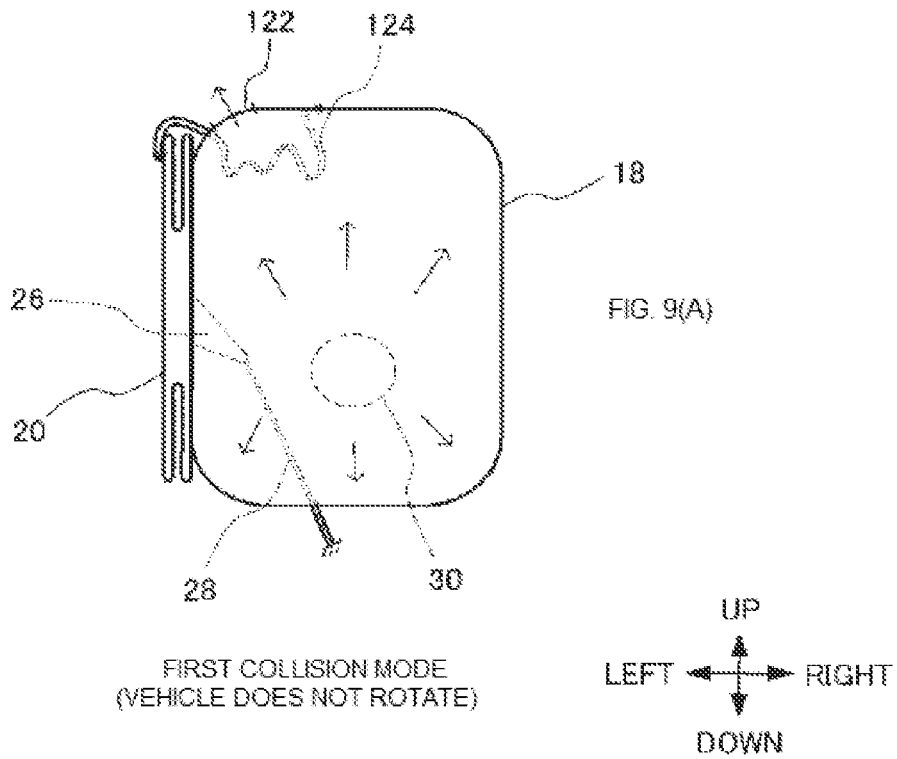
FIGS. 9(A) and 9(B) are explanatory diagrams showing an operating state of an airbag device according to a second practical example of the present invention, in which 9(A) shows a deployed state of an airbag in the first collision mode such as a head-on collision, and 9(B) shows a deployed state of the airbag in the second collision mode such as an oblique collision.
Figure 9B:
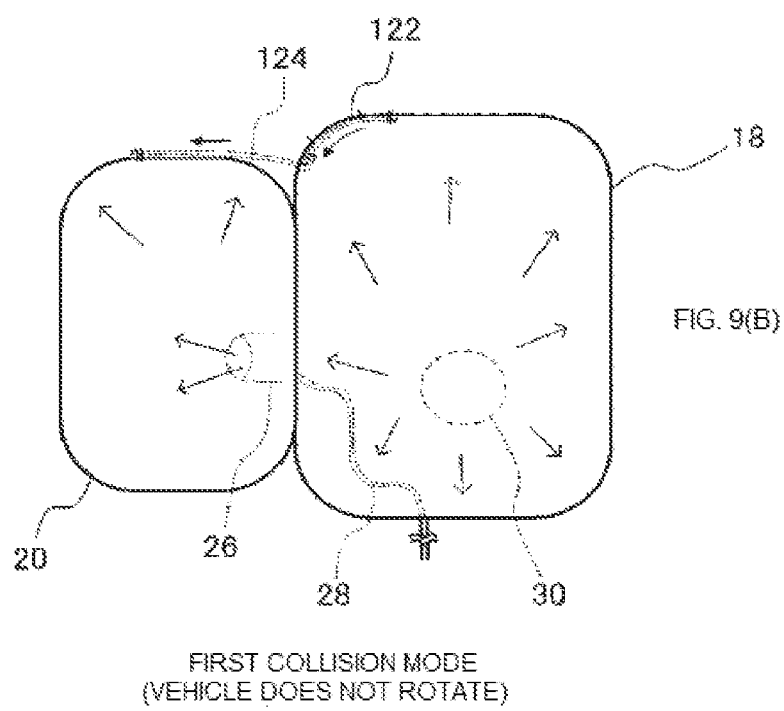

FIGS. 9(A) and (B) are explanatory diagrams showing an operating state of an airbag device according to a second embodiment of the present invention, in which FIG. 9(A) shows a deployed state of an airbag in the first collision mode such as a head-on collision, and FIG. 9(B) shows a deployed state body of the airbag in the second collision mode such as an oblique collision. Although the airbag device according to the present practical example shares the same basic structure as the first practical example described above, there are differences in a structure and an operation of a vent mechanism. Moreover, redundant descriptions will be omitted with respect to configurations and operations similar to those of the first practical example.

In a similar manner to the first practical example, a joint of the first airbag 18 and the second airbag 20 is provided with an openable and closable first vent 26 which communicates with both airbags 18 and 20, and is configured so that gas flows into the second airbag 20 from the first airbag 18 during the second collision mode. In other words, the first vent 26 is configured so as to open only when the second collision mode occurs. One end of a first tether 28 which controls opening and closing is joined to the first vent 26. Another end of the first tether 28 is joined to a housing (not shown) outside of the airbag and is configured so as to be severed when the second collision mode is detected.

For the second embodiment elements which are equivalent to those described in connection with the first embodiment are designated by the same reference number with 100 added. An openable and closable second vent opening 122 is provided in a vehicle center-side upper part of the first airbag 18. Opening and closing of the second vent opening 122 is controlled by a second tether 124. One end of the second tether 124 is joined close to an inner-side upper end of the first airbag 18, and another end thereof is passed through the second vent opening 122 to extend outside the airbag and is joined close to an upper end of an outer surface of the second airbag.

In a similar manner to the first practical example, control of opening and closing of the first vent 26 and the second vent 122 is performed by adjusting tension on the tethers 28 and 124. The vent 26 is configured such that, like a drawstring bag, an end of a tether is inserted to a peripheral edge of an opening portion, and the opening is closed by pulling the tether and opened by loosening the tether. On the other hand, the second vent opening 122 adopts a system of a so-called patch plug vent and is configured such that the vent is closed by covering the opening with a flap and the vent is opened by loosening the flap.

In the second embodiment configured as described above, when the first collision mode occurs, the inflator 30 operates and the first airbag 18 expands first as shown in FIG. 9(A). At this point, since the tether cutter 34 does not sever the first tether 28, tension on the first tether 28 maintains a high state, the first vent 26 remains closed, and expansion gas does not flow into the second airbag 20. In addition, tension on the second tether 124 remains in a low state, the second vent 122 is opened, and a part of gas is discharged from the second vent 122. A forward movement of the occupant 12 of the passenger seat is restrained by the expanded and deployed first airbag 18.

On the other hand, when the second collision mode occurs, the inflator 30 operates and the first airbag 18 expands first as shown in FIG. 9(B). At this point, the first tether 28 is severed by the tether cutter 34, tension on the first tether 28 is relaxed, the first vent 26 is opened, and expansion gas flows into the second airbag 20 via the vent 26 from the first airbag 18. Expansion of the second airbag 20 causes the second tether 124 to be pulled and the second vent 122 formed on the first airbag 18 to be closed. In addition, the expanded and deployed first airbag 18 restrains a forward movement of the occupant 12 of the passenger seat and, at the same time, the second airbag 20 restrains an obliquely forward movement.

In the first and second practical examples described above, since a structure is adopted in which gas is not discharged by venting from the first airbag 18 when the second airbag 20 is deployed, an amount of necessary gas can be kept to a minimum amount. As a result, an increase in performance of the inflator 30 caused by providing a plurality of airbags can be suppressed. Second vents 22 and 122 are needed since an excess of inflation gas is produced when the second airbag 20 is not deployed.

Figure 10A:
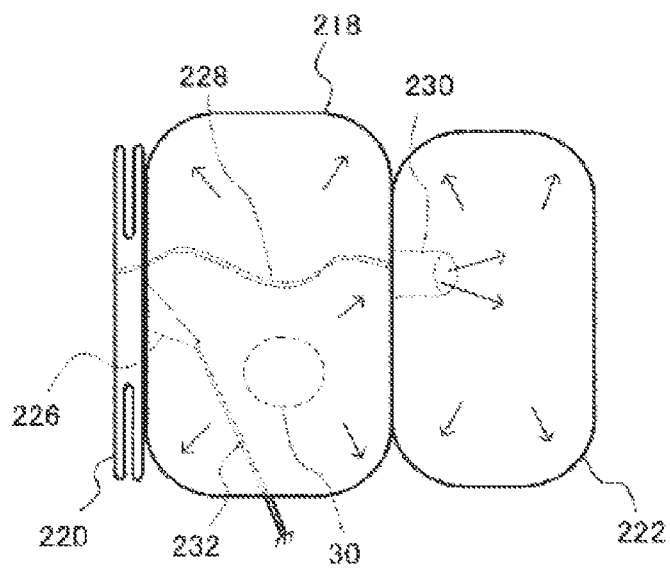
FIGS. 10(A) and 10(B) are explanatory diagrams showing an operating state of an airbag device according to the second practical example of the present invention, in which 10(A) shows a deployed state of an airbag in the first collision mode such as a head-on collision, and 10(B) shows a deployed state of the airbag in the second collision mode such as an oblique collision.
Figure 10B:
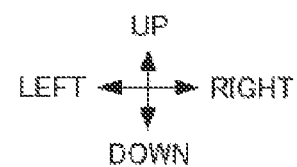
Figure 10B:
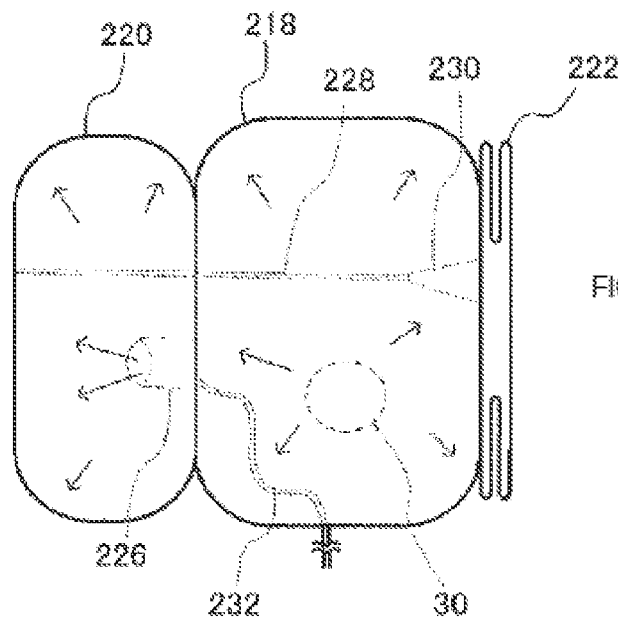

FIGS. 10(A) and (B) are explanatory diagrams showing an operating state of an airbag device according to a third embodiment of the present invention, in which FIG. 10(A) shows a deployed state of an airbag in the first collision mode such as a head-on collision, and FIG. 10(B) shows a deployed state body of the airbag in the second collision mode such as an oblique collision. The airbag device according to the present embodiment differs from those of the first embodiment and the second embodiment described above in that the airbag device uses three airbags. Moreover, redundant descriptions will be omitted with respect to configurations and operations similar to those of the first and second practical examples. For the third embodiment elements which are equivalent to those described in connection with the first embodiment are designated by the same reference number with 200 added.

The present embodiment further includes a third airbag 222 joined to a side part of the first airbag 218 on the window (outboard) side. In addition, the third airbag 222 is configured to deploy only when the first collision mode occurs. In the present embodiment, when the first collision mode occurs, a front airbag 218 and a vehicle window-side airbag 222 are deployed to restrain movements of the occupant 12 toward the front and toward an outer side. In addition, when the second collision mode occurs, the front airbag 218 and a vehicle center-side airbag 220 are deployed to restrain movements of the occupant 12 toward the front and toward a center side (a side of the center console).

In a similar manner to the first and second embodiments, a joint of the first airbag 218 and the second airbag 220 is provided with an openable and closable first vent 226 which communicates with both airbags 218 and 220, and is configured so that gas flows into the second airbag 220 from the first airbag 218 during the second collision mode. In other words, the first vent 226 is configured so as to open only when the second collision mode occurs. One end of a first tether 232 which controls opening and closing is joined to the first vent 226. Another end of the first tether 232 is joined to a housing (not shown) outside of the airbag and is configured so as to be severed when the second collision mode is detected.

A joint of the first airbag 218 and the third airbag 222 is provided with an openable and closable second vent 230 which communicates with both airbags 218 and 222, and is configured so that gas flows into the third airbag 222 from the first airbag 218 during the first collision mode. In other words, the second vent 230 is configured so as to open only when the first collision mode occurs. One end of a second tether 228 which controls opening and closing is joined to the second vent 230. Another end of the second tether 228 penetrates the first airbag 218 and is joined to an inner-side side surface of the second airbag 220.

Control of opening and closing of the first vent 226 and the second vent 230 is performed by adjusting tension on the tethers 232 and 228. Both vents 226 and 230 are configured such that, like a drawstring bag, an end of a tether is inserted to a peripheral edge of an opening portion, and the opening is closed by pulling the tether and opened by loosening the tether.

In the third embodiment configured as described above, when the first collision mode occurs, the inflator 30 operates and the first airbag 218 expands first as shown in FIG. 10(A). At this point, since the tether cutter 34 does not sever the first tether 232, tension on the first tether 232 maintains a high state, the first vent 226 remains closed, and expansion gas does not flow into the second airbag 220. In addition, tension on the second tether 228 remains in a low state, the second vent 230 is opened, a part of gas flows into the third airbag 222 from the second vent 230, and the third airbag 222 is deployed. A forward movement of the occupant 12 of the passenger seat is restrained by the expanded and deployed first airbag 218 and third airbag 222.

On the other hand, when the second collision mode occurs, the inflator 30 operates and the first airbag 18 expands first as shown in FIG. 10(B). At this point, the first tether 232 is severed by the tether cutter 34, the first tether 232 is loosened, the first vent 226 is opened, and expansion gas flows into the second airbag 220 via the vent 226 from the first airbag 218. Since expansion of the second airbag 220 causes the second tether 228 to be pulled, the second vent 230 closes and the third airbag 222 is not deployed. In addition, the expanded and deployed first airbag 218 restrains a forward movement of the occupant 12 of the passenger seat and, at the same time, the second airbag 220 restrains an obliquely forward movement.

In the third embodiment, a rotational direction of the vehicle can be detected by the collision sensor 32 and, in accordance thereto, deployment of the first to third airbags 218, 220, and 222 can be controlled with further precision. For example, a configuration can be adopted in which the third airbag 222 is deployed only when the vehicle rotates in a counterclockwise direction which is opposite to the state shown in FIG. 6, and only the first airbag 218 is deployed in the case of a collision not accompanied with a rotation (the first collision mode).

While embodiments of the present invention have been described above, it is to be understood that the present invention is not limited to such practical examples and various modifications may be made within the scope of the technical concepts described in the respective claims.

While the above description constitutes the preferred embodiment of the present invention, it will be appreciated that the invention is susceptible to modification, variation and change without departing from the proper scope and fair meaning of the accompanying claims.

The invention claimed is:

1. An airbag device for restraining a forward movement of an occupant seated on a vehicle seat of a vehicle adapted for use with a collision sensor, comprising:
    an inflator which is operated by a signal from the sensor that detects a collision of the vehicle and which discharges an expansion gas; and
    a plurality of airbags which expand and deploy due to the expansion gas, wherein the plurality of airbags includes a first airbag which deploys to the front of the occupant; and a second airbag which is joined to a side part of the first airbag on a cabin center side with respect to the occupant and is adapted to restrain an obliquely forward movement of the occupant when deployed,
    the collision sensor of a type capable of discriminating between a first collision mode which is not accompanied by a significant rotation of the vehicle in a horizontal plane and a second collision mode which is accompanied by a significant rotation of the vehicle in the horizontal plane, and
    the first airbag is deployed in the first and the second collision modes and the second airbag is deployed only when the second collision mode occurs and the second airbag is not deployed when the first collision mode occurs, the inflator discharges the expansion gas into the first airbag in the first collision mode and in the second collision mode,
    a joint of the first airbag and the second airbag is provided with an openable and closable inflation vent opening which communicates with both the first and the second airbags, and
    the inflation vent opening is configured so that the gas flows into the second airbag from the first airbag during the second collision mode.

2. The airbag device according to claim 1, further comprising wherein the inflation vent opening opens to permit the gas flow only when the second collision mode occurs.

3. The airbag device according to claim 1, further comprising an inflation vent tether which adjusts an opening and a closing of the inflation vent opening and is joined to the inflation vent opening.

4. The airbag device according to claim 3, further comprising the inflation vent tether is severed when the second collision mode is detected causing the inflation vent opening to open.

5. The airbag device according to claim 3, further comprising the inflation vent tether is controlled in response to the collision sensor detecting the first collision mode or the second collision mode.

6. The airbag device according to claim 1, further comprising a third airbag joined to a side part of the first airbag on a window side of the vehicle.

7. The airbag device according to claim 6, further comprising wherein the third airbag is deployed only when the first collision mode occurs.

8. The airbag device according to claim 7, further comprising a second inflation vent opening between the first airbag and the third airbag, the second inflation vent opening is configured so that the gas flows from the first airbag to the third airbag through the second inflation vent opening only when the first collision mode occurs, and the second vent opening is closed in the second collision mode.

9. The airbag device according to claim 8, further comprising a second inflation vent tether connected with the second vent opening.

10. The airbag device according to claim 9, further comprising the second inflation vent tether having one end connected with the second airbag and an opposite end connected with the second inflation vent opening wherein when the second airbag is not deployed the second inflation vent opening is open to allow inflation of the third airbag and when the second airbag is deployed tension is applied to the second inflation vent tether causing the second inflation vent opening to close.

11. The airbag device according to claim 7, further comprising wherein the third airbag is not deployed when the second collision mode occurs.

12. The airbag device according to claim 6, further comprising the third airbag is positioned on a window side of the vehicle with respect to the occupant.

13. The airbag device according to claim 6, further comprising the second and the third airbags are joined with the first airbag on opposite lateral sides of the first airbag.

14. The airbag device according to claim 1, further comprising an exhaust vent opening between the first airbag and atmosphere, the exhaust vent opening is configured so that the gas flows from the first airbag to the atmosphere through the exhaust vent opening only when the first collision mode occurs, the exhaust vent opening is closed in the second collision mode.

15. The airbag device according to claim 14, further comprising an exhaust vent tether for controlling a closing of the exhaust vent opening.

16. The airbag device according to claim 15, further comprising the exhaust vent tether is connected at one end to the exhaust vent opening and at an opposite end to a portion of the second airbag such that inflation of the second airbag places tension on the exhaust vent tether in a manner to close the exhaust vent opening thereby closing the exhaust vent opening in the second collision mode.

\* \* \* \* \*